United States Patent
Kawachiya et al.

(10) Patent No.: US 9,135,169 B2
(45) Date of Patent: Sep. 15, 2015

(54) METHOD, PROGRAM AND SYSTEM FOR GENERATING HASH CODES TO IDENTIFY OBJECTS

(71) Applicant: International Business Machines Corporation, Armonk, NY (US)

(72) Inventors: Kiyokuni Kawachiya, Kanagawa (JP); Tamiya nodera, Tokyo (JP); Mikio Takeuchi, Kanagawa (JP); Salikh S Zakirov, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 13/752,435

(22) Filed: Jan. 29, 2013

(65) Prior Publication Data

US 2013/0204912 A1    Aug. 8, 2013

(30) Foreign Application Priority Data

Feb. 2, 2012 (JP) ................................ 2012-021187

(51) Int. Cl.
    *G06F 12/02*    (2006.01)
    *G06F 17/30*    (2006.01)
    *G06F 9/44*     (2006.01)

(52) U.S. Cl.
    CPC .......... *G06F 12/0276* (2013.01); *G06F 9/4428* (2013.01); *G06F 12/0253* (2013.01); *G06F 17/30097* (2013.01)

(58) Field of Classification Search
    CPC .............. G06F 12/0276; G06F 9/4428; G06F 17/30097
    See application file for complete search history.

(56) References Cited

U.S. PATENT DOCUMENTS

| | | | |
|---|---|---|---|
| 5,542,078 A * | 7/1996 | Martel et al. .......................... | 1/1 |
| 6,169,990 B1 * | 1/2001 | McGregor et al. .................... | 1/1 |
| 6,233,621 B1 * | 5/2001 | Joy ............................... | 719/315 |
| 6,480,862 B1 * | 11/2002 | Gall .................................... | 1/1 |
| 8,176,100 B2 * | 5/2012 | Onodera et al. .............. | 707/819 |
| 8,386,787 B2 * | 2/2013 | Farrugia et al. ............... | 713/176 |
| 8,612,956 B2 * | 12/2013 | Maier et al. ................... | 717/158 |

(Continued)

FOREIGN PATENT DOCUMENTS

JP    2010-204955 A    9/2010

OTHER PUBLICATIONS

Ole Agesen, "Space and Time-Efficient Hashing of Garbage-Collected Objects", Theory and Practice of Object Systems, 1998, U.S. A.

*Primary Examiner* — Leslie Wong
(74) *Attorney, Agent, or Firm* — Jeff Tang

(57) ABSTRACT

A computer-implemented method, system, and article of manufacture for generating hash codes to identify objects. The method increases variation in object hash codes to reduce conflict between object hash codes and enables them to be added to pinned objects. The method includes: generating a seed value for each heap area and generating the hash code on the basis of address of the object and seed value of the heap area to which the object is allocated. The article of manufacture includes computer readable instructions which, when implemented, cause a computer to perform the steps of the above method. The computer-implemented system includes a processor; and a memory which includes a hash code, an object, a seed value, and a heap area, wherein the processor is configured to perform the steps of the above method.

9 Claims, 8 Drawing Sheets

(56) References Cited

U.S. PATENT DOCUMENTS

| | | | |
|---|---|---|---|
| 2001/0042204 A1* | 11/2001 | Blaker et al. | 713/165 |
| 2006/0143454 A1* | 6/2006 | Walmsley | 713/170 |
| 2007/0234296 A1* | 10/2007 | Zorn et al. | 717/124 |
| 2007/0234297 A1* | 10/2007 | Zorn et al. | 717/124 |
| 2009/0150875 A1* | 6/2009 | Maier et al. | 717/158 |
| 2010/0070549 A1* | 3/2010 | Nagaraj | 708/254 |
| 2010/0229159 A1 | 9/2010 | Ohira et al. | |
| 2010/0293338 A1* | 11/2010 | Krishnaprasad et al. | 711/136 |
| 2014/0173034 A1* | 6/2014 | Liu et al. | 709/217 |

* cited by examiner

METHOD, PROGRAM AND SYSTEM FOR GENERATING HASH CODES TO IDENTIFY OBJECTS

CROSS-REFERENCE TO RELATED APPLICATION

This application claims priority under 35 U.S.C. §119 from Japanese Patent Application No. 2012-021187 filed Feb. 2, 2012, the entire contents of which are incorporated herein by reference.

BACKGROUND OF THE INVENTION

1. Field of the Invention

The present invention relates to a method of generating hash codes to identify objects in a computer system and enables object hash codes to be assigned to pinned objects.

2. Description of Related Art

As described in Laid-open Patent Publication No. 2010-204955, a hash value is generated and assigned to an object generated using Java® and allocated to a heap area in order to track and locate the object. More specifically, a computer system generates a table including generated hash values and the objects' references. An object is located by looking up the hash value in the table.

The hash value is calculated from the address of the object. The hash value is stored, for example, in a 15-bit area in the object header. Typically, there is a two-bit area in the object header which has the following meaning:

"00"=Not hashed. The object does not yet have a hash code.
"01"=Hashed. The object hash code can be calculated from the object address.
"10"=Hashed and moved. An object hash code has been added to the object.

When object hash codes are generated on the basis of object addresses, a conflict occurs between object hash codes because of the limited number of object address values, and performance degrades.

To increase the variation in object hash codes, a seed value is added to a heap to generate an object hash code (O. Agesen, "Space and Time-Efficient Hashing of Garbage-Collected Objects", Theory and Practice of Object Systems, 1998). This seed is used for young (nursery) heap area in generational garbage collection (GC).

The technique described in "Space and Time-Efficient Hashing of Garbage-Collected Objects" is not used for other types of GC, such as GC in a non-generational heap area. It also does not cope with object pinning.

SUMMARY OF INVENTION

Accordingly, in one aspect, the present invention provides a computer-implemented method to generate a hash code to identify an object allocated to a heap area, including the steps of: generating a seed value for each heap area; and generating the hash code on the basis of the address of the object and the seed value of the heap area to which the object is allocated.

Another aspect of the present invention provides a non-transitory article of manufacture in the form of computer readable instructions that causes a computer to generate a hash code to identify an object allocated to a heap area, including the steps of: generating a seed value for each heap area; and generating the hash code on the basis of the address of the object and the seed value of the heap area to which the object is allocated.

Also provided is a computer-implemented system for generating a hash code for identifying an object allocated to a heap area, the system including a processor and a memory which includes a hash code, an object, a seed value and a heap area, wherein the processor is configured to perform the steps of a method including: generating the seed value for each heap area; and generating the hash code on the basis of the address of the object and the seed value of the heap area to which the object is allocated.

Thus, the present invention provides a per-heap-area seed in each heap area in which an object has been placed in order to generate an object hash code.

DETAILED DESCRIPTION OF PREFERRED EMBODIMENTS

Figure 1:
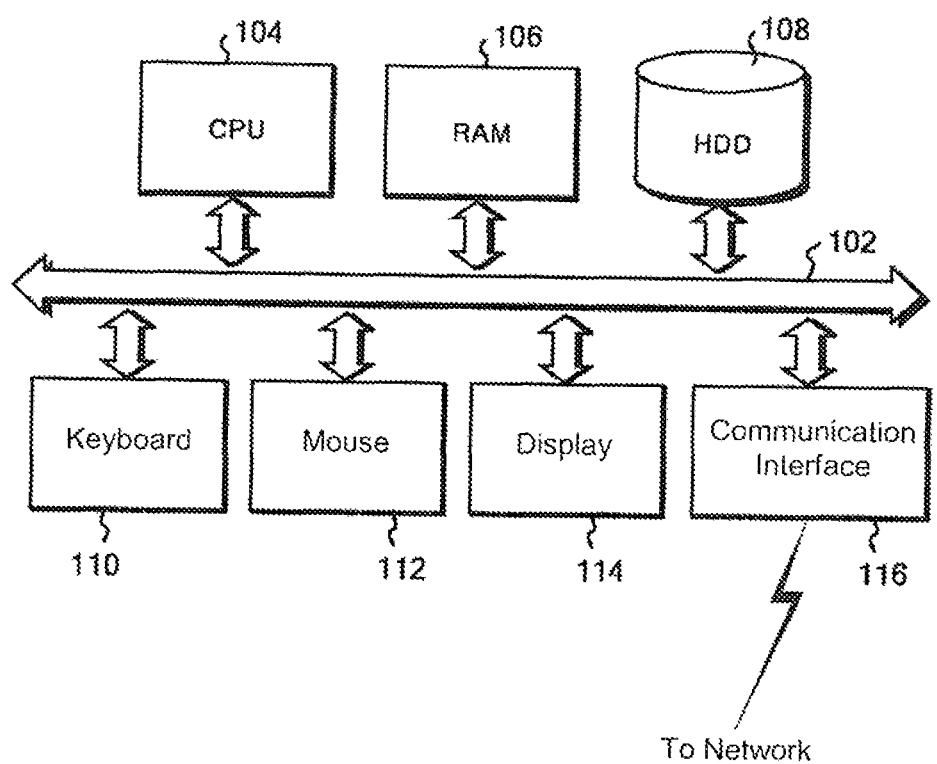
FIG. 1 is a block diagram which shows examples of hardware used according to one embodiment of the present invention.

When object hash codes are generated on the basis of object addresses, conflicts can occur between object hash codes because of the limited number of object address values, therefore, performance degrades. In contrast, the present invention resolves these conflicts by providing a per-heap-area seed in each heap area in which an object is placed in order to generate an object hash code. In other words, in the system of the present invention, an object hash code is composed of at least the combined object address and per-heap-area seed.

The present invention is directed at an enhanced technique for identifying generated objects in a computer system by generating hash codes to identify the objects. More specifically, the present invention increases the variation in object hash codes to reduce conflicts between object hash codes and enables object hash codes to be assigned to pinned objects.

In a preferred embodiment of the present invention, object address, per-heap-area seed, and class ID of the object are combined to generate an object hash code.

In an embodiment of the present invention, it is determined whether an object hash code can be added to an object in a hashed state (a "01" state) during garbage collection (GC). If an object hash code can be added, an object hash code is calculated. The calculated object hash code is then added to the object, and the state of the object is changed from "01" to "10". If an object hash code cannot be added to an object then an object hash code is calculated, and the calculated hash code is placed outside of the heap. A hash code is associated with an object, and the state of an object is changed from "01" to "11". A "11" state enables a hash code to be assigned to a pinned object.

If the state of an object during GC is "11," it is determined whether an object hash code can be added to the object. If an object hash code can be added to an object, an object hash code is read from a table outside of a heap and is added to the object. The state of the object is changed to "10" and object hash code is deleted outside of the heap.

In the present invention, providing a seed to generate an object hash code in each heap increases the variation in generated object hash codes. This can reduce hash conflict, and reduce the amount of time needed to locate an object. Further, in an embodiment of the present invention, because an object hash code can be placed outside of a heap, object hash codes can be assigned to pinned objects as appropriate.

Aspects of the present invention can be embodied as a system, method, or a computer program product. Configuration and processing of preferred embodiments of the present invention with reference to the accompanying drawings are described herein below wherein identical objects are denoted by the same reference numeral in all of the drawings unless otherwise specified. It should be understood that embodiments that follow are intended to describe preferred aspects of the invention without limiting the scope thereof.

In FIG. 1, a block diagram illustrates computer hardware utilized to realize the system configuration and processing of the present invention. CPU 104, RAM (main memory) 106, HDD (hard disk drive) 108, Keyboard 110, Mouse 112 and Display 114 are connected to 102, a system bus. CPU 104, in an embodiment of the present invention, is preferably based on a 32-bit or 64-bit architecture. For example, Pentium™ 4 from Intel®, Core™ 2 Duo from Intel®, or Athlon™ from AMD can all be used. RAM 106, in the present invention, has a storage capacity of at least 2 GB. More preferably, in an embodiment of the present invention, RAM 106 has a storage capacity of at least 4 GB.

Figure 2:
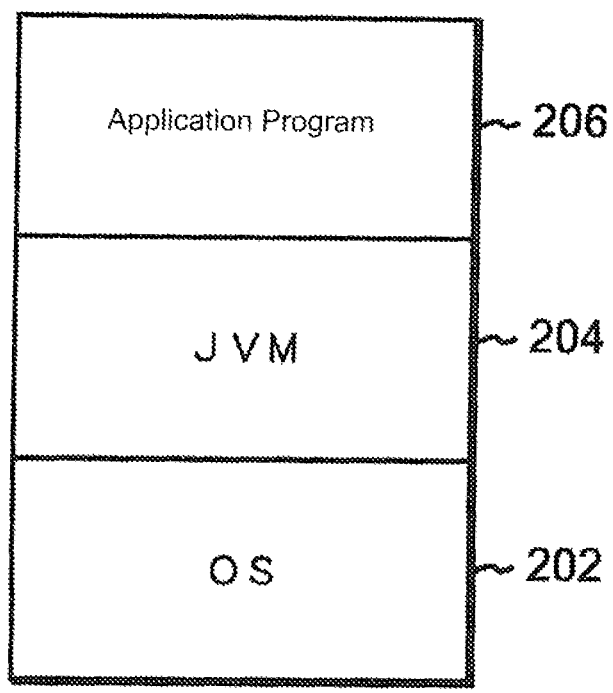
FIG. 2 is a diagram showing the hierarchy of software used according to one embodiment of the present invention.

FIG. 2 shows a diagram demonstrating the hierarchy of programs and processes. In an embodiment of the current invention, OS (operating system) 202 is stored in HDD 108 in FIG. 1. OS 202 provides a graphic user interface. Examples of an OS 202 that are usable for carrying out the present invention include Linux®, Windows® 7, Windows® XP, Windows® 2003 Server, and Mac OS®. In a preferred embodiment of the present invention OS 202 should be compatible with CPU 104 in FIG. 1.

In FIG. 1, HDD108, in an embodiment of the current invention, has capabilities which include storing a program. For example a program, Apache™, can be stored for operating the system as a Web server. HDD 108, in an embodiment of the current invention, stores a Java™ Runtime Environment program for realizing a JVM (Java™ virtual machine) 204 in FIG. 2. The function of the present invention is performed by JVM 204. The stored program and JVM 204, in an embodiment of the current invention, are loaded into RAM 106 when the system boots up.

According to the present invention, the byte code of a Application Program 206 in FIG. 2 is stored in HDD108 in FIG. 1. Additionally, in FIG. 1, a Keyboard 110 and Mouse 112 can be used to manipulate graphic objects, such as icons, task bars and text boxes displayed on Display 114 in accordance with the graphic user interface provided by OS 202 in FIG. 2. Display 114, in FIG. 1, in a preferred embodiment of the present invention is a 32-bit true color LCD monitor with a resolution of at least 1024×768. Display 114 is used, for example, to display the results of operations performed by an application program executed in JVM 204 in FIG. 2.

Communication Interface 116, in FIG. 1, in a preferred embodiment, is connected to a network using the Ethernet® protocol. In the present invention Communication Interface 116 receives processing requests in accordance with a communication protocol, for example TCP/IP, from a client computer (this is not shown) using functions provided by a program, for example in one embodiment of the present invention, Apache, and processing results are sent to the client computer (this is not shown).

FIG. 2 shows the hierarchy of programs and processes. OS 202 for the present invention operates in the hardware shown in FIG. 1, and JVM 204 operates in a OS 202.

Accordingly, an Application Program 206, in an embodiment of the present invention, is composed of Java™ byte code, and operates in a JVM 204. JVM 204 prepares a heap area in HDD 108 of FIG. 1 for Application Program 206. During operations of the present invention, Application Program 206 acquires a memory area in the heap area and allocates a generated object to it. In an embodiment of the present invention, when a heap area is a generational heap area, it has at least one first generation (nursery) heap area for allocating new objects, and at least one second generation (tenure) heap area. In an embodiment of the present invention, when the first generation heap area is full, JVM 204 performs GC in the first generation heap area, and can move surviving objects from the first generation heap area to the second generation heap area. As a result, objects that survived for a while are collected in the second generation heap area. When the second generation heap area is full, JVM 204 performs GC in all heap areas.

When there are non-generational heap areas, all heap areas are treated as first generation heap areas. The present invention can be applied to both generational heap areas and non-generational heap areas.

Figure 3:
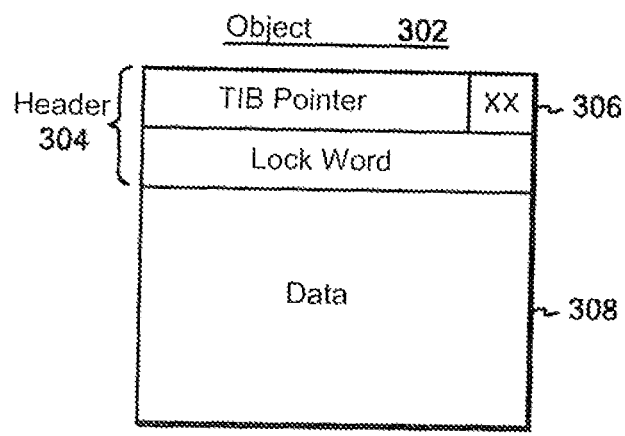
FIG. 3 is a diagram which shows the format of an object header according to one embodiment of the present invention.

FIG. 3 is a diagram which shows the format of an object header according to one embodiment of the present invention. The object is allocated to a heap area. As shown in FIG. 3, Object 302 has Header 304 followed by Data 308. Header 304 and Data 308 constitute the object itself.

Header 304 has a TIB (type information block) Pointer, XX (two-bit area) 306, and a Lock Word. TIB pointer is a pointer to an object that represents a type (class), and the lock word stores an object lock status and GC flags.

XX (two-bit area) 306 is used to indicate the following: "00"=Not hashed. Object does not yet have a hash code; "01"=Hashed. Object hash code has been and can be calculated from object address; "10"=Hashed and moved. Object hash code has been added to object; "11"=Hashed and hash code is stored in a table outside heap. This is performed, for example, when movement of a pinned object has failed.

Figure 4:
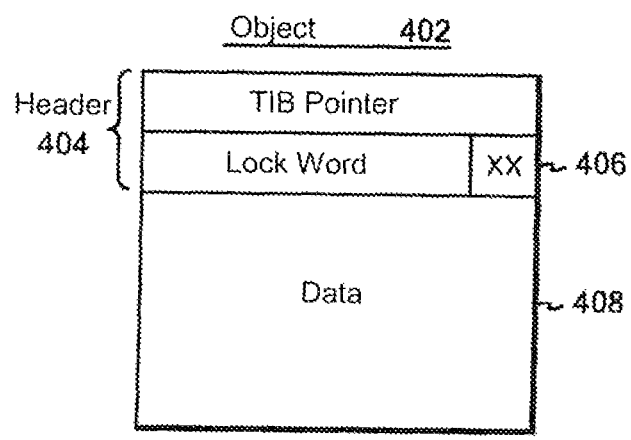
FIG. 4 is a diagram which shows the format of an object header according to another embodiment of the present invention.

In FIG. 3, XX (two-bit area) 306 is placed near the TIB Pointer. However, as shown in FIG. 4, which is another embodiment of the present invention, XX (two-bit area) 406, can be placed near the Lock Word.

In flowcharts in FIG. 5-FIG. 9, an embodiment of the present invention has XX (two-bit area) 306 that is referred to as the state bits.

Figure 5:
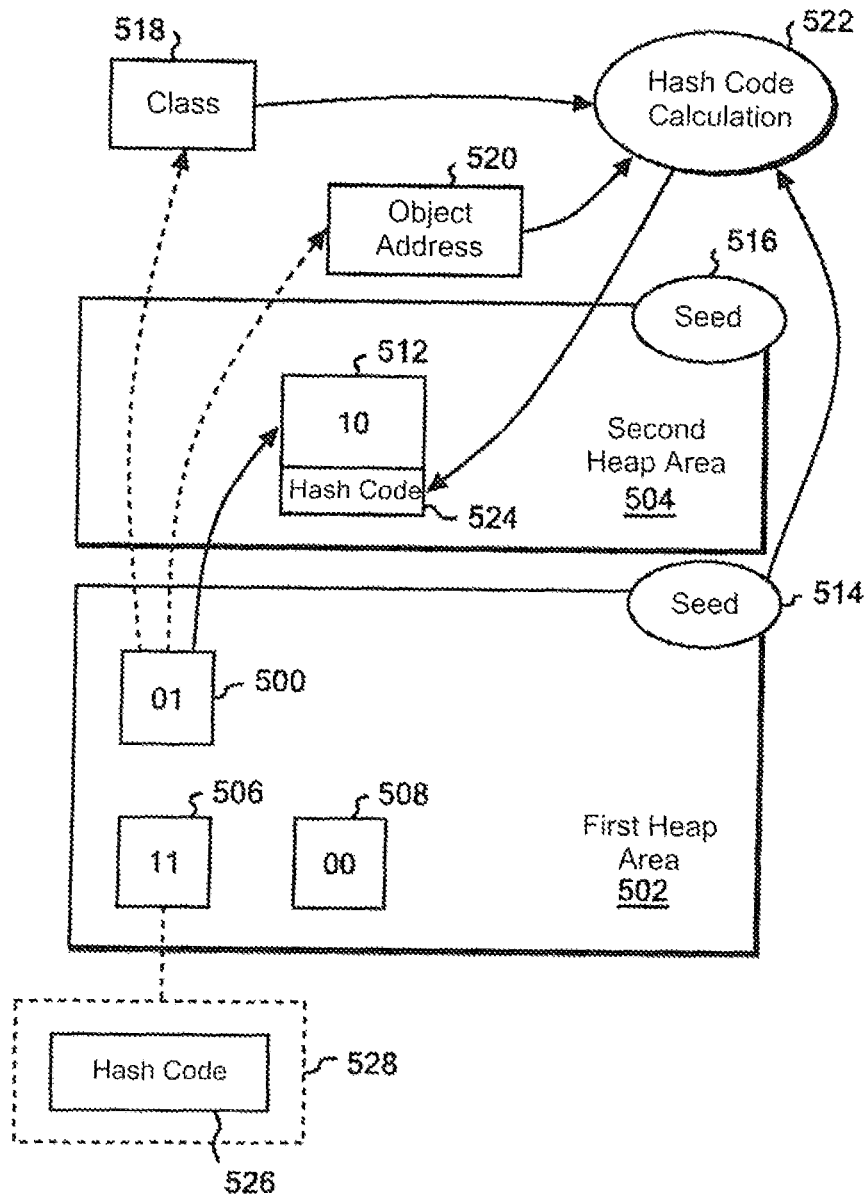
FIG. 5 is a detailed schematic diagram used to exhibit the operation of the present invention.

FIG. 5 is a diagram schematically illustrating the processing performed in the present invention. In FIG. 5, there is First (nursery) Heap Area 502 and Second (tenure) Heap Area 504. First Heap Area 502 contains Objects 500, 506, and 508. Each object has values in two-bit area as shown in FIG. 3 and FIG. 4.

Seed 514 value is associated with First Heap Area 502 and Seed 516 value is associated with Second Heap Area 504.

Seed 514 and 516 values are placed in a predetermined management area in memory outside the heaps. Because there is a seed for each heap, seeds are referred to as per-heap-area seeds. Values of the per-heap-area seeds are, in an embodiment of the present invention, preferably updated by generating a pseudo-random number. For example, during GC for First Heap Area 502 or compaction for Second Heap Area 504.

A hash code is assigned to Object 500, which has a two-bit value of "01". This is omitted from FIG. 5. In the present invention, when Object 500 is moved to Second Heap Area 504, Object 500 becomes Object 512 with a two-bit value of "10". A hash code is calculated by Hash Code Calculation 522. Hash Code Calculation 522 utilizes three values: Class 518 ID of Object 500, Object Address 520 of Object 500, and Seed 514 for First Heap Area 502. The calculated value, Hash Code 524, is added to the end of Object 512. In an embodiment of the present invention, Hash Code Calculation 522 does not require utilizing all three values: Class 518 ID of Object 500, Object Address 520 of Object 500, and Seed 514 for First Heap Area 502. Hash Code Calculation 522 can calculate a hash code from two values: Object Address 520 of Object 500 and Seed 514 for First Heap Area 502.

When an attempt is made to add a hash code to the end of Object 506, a hash code could not be added because it is adjacent to Object 508. In the present invention, this situation is addressed (i) by placing Hash Code 526, calculated by Hash Code Calculation 522, in an area outside Heap 528, and (ii) by associating Hash Code 526 with Object 506. More specifically, a pointer to Object 506 is placed in the area including Hash Code 526.

Figure 6:
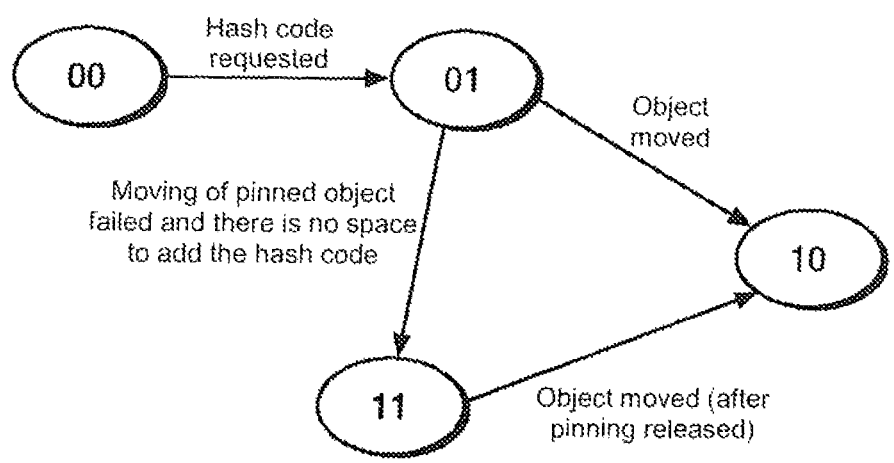
FIG. 6 is a diagram which illustrates the possible state bit transitions for an object in the present invention.

FIG. 6 is a state transition diagram for the two-bit codes in objects. Initially, the two-bit code of an object is "00". In the present invention, when a hash code is requested, the two-bit code changes from "00" to "01". When an object in the "01" state is moved, the two-bit code of the object becomes "10" and a hash code is added to the end of the moved object. In an embodiment of the present invention, if movement of an object from the "01" state fails, it is because movement of a pinned object has failed. Therefore, a hash code cannot be added, and the two-bit code of an object changes from "01" to "11" and the hash code is stored in the table outside the heap. If an object in the "11" state is unpinned and moved, the two-bit code of the object becomes "10" and the hash code is added to the end of the moved object and the hash code stored in the table is deleted.

Figure 7:
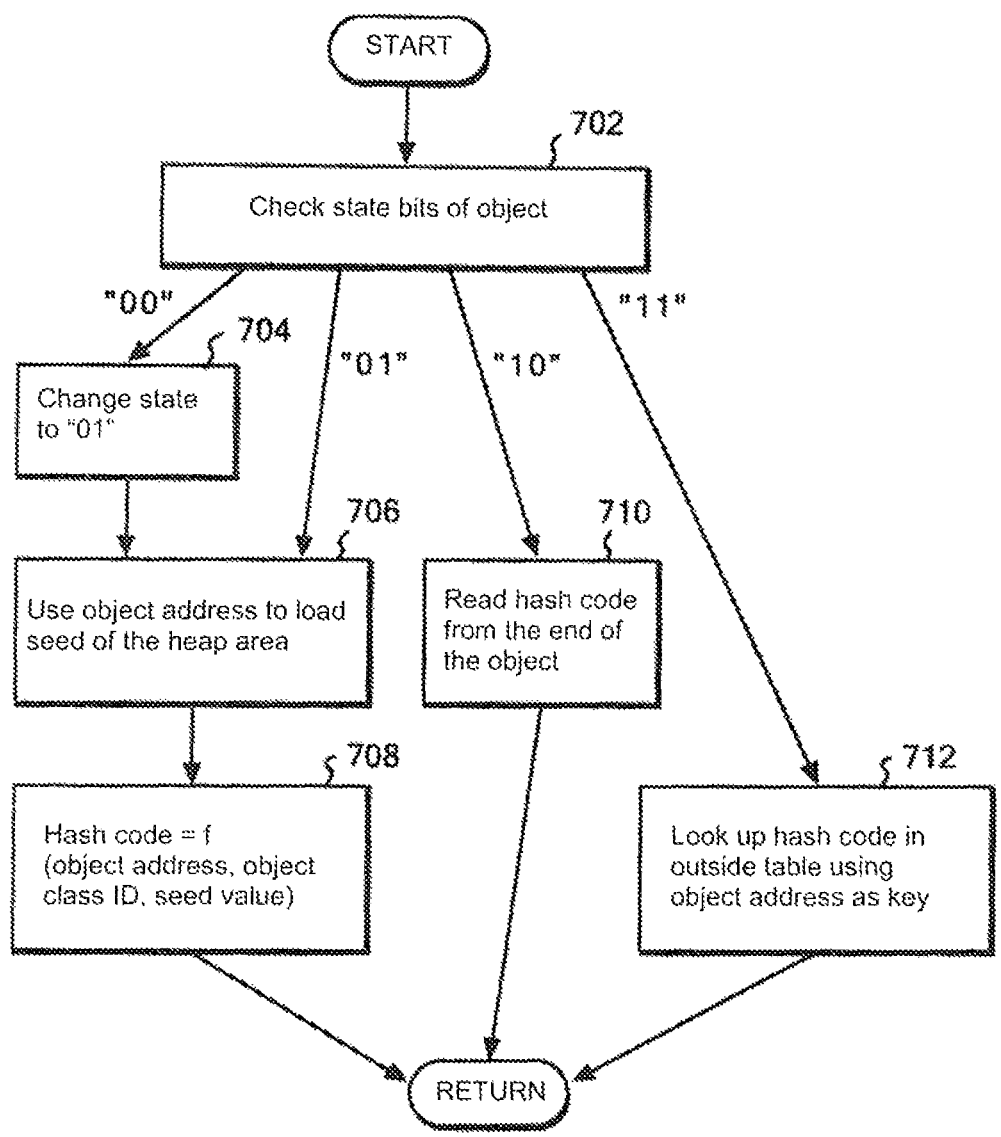
FIG. 7 illustrates a flowchart of the processing performed to generate a hash code according to the present invention.

The hash code generating process performed by JVM 204 in FIG. 2 is in reference to the flowchart in FIG. 7. In Step 702 of FIG. 7, JVM 204 checks the state bits (the two-bit code) of an object for which a hash code is to be generated.

In FIG. 7, in an embodiment of the present invention, if the state bits are in a "00" state, JVM 204, shown in FIG. 2, changes the state bits to a "01" state in Step 704, and proceeds to Step 706. If the state bits are "01", the JVM 204 proceeds directly to Step 706. In Step 706, JVM 204 uses the object address to load the seed of the heap in which the object is located. In Step 708, the hash code is calculated according to Hash code=f (object address, object class ID, seed value). In the present invention there is no restriction on the specific formula used in hash code calculation, but the following is an example: Hash Code=(Object Address>>3) XOR Seed Value XOR Object Class ID For Hash Code Calculation 522 in FIG. 5, for an embodiment of the present invention, the following formula can be applied when the object Class 518 ID is not used: Hash Code=(Object Address>>3) XOR Seed Value. For different embodiments of the present invention, other formulas can be used, including those combining known operations such as bit shift operations and XOR.

In Step 702, if the state bits are in a "10" state, JVM 204 in Step 710 reads the hash code from the end of the object. In an embodiment of the present invention, hash code can be, for example, Hash Code 524 in FIG. 5. Returning to Step 702, if the state bits are in a "11" state, JVM 204 in Step 712 uses the object address as a key to look up the hash code in an outside table. This can be, for example, Hash Code 526 in FIG. 5.

Figure 8:
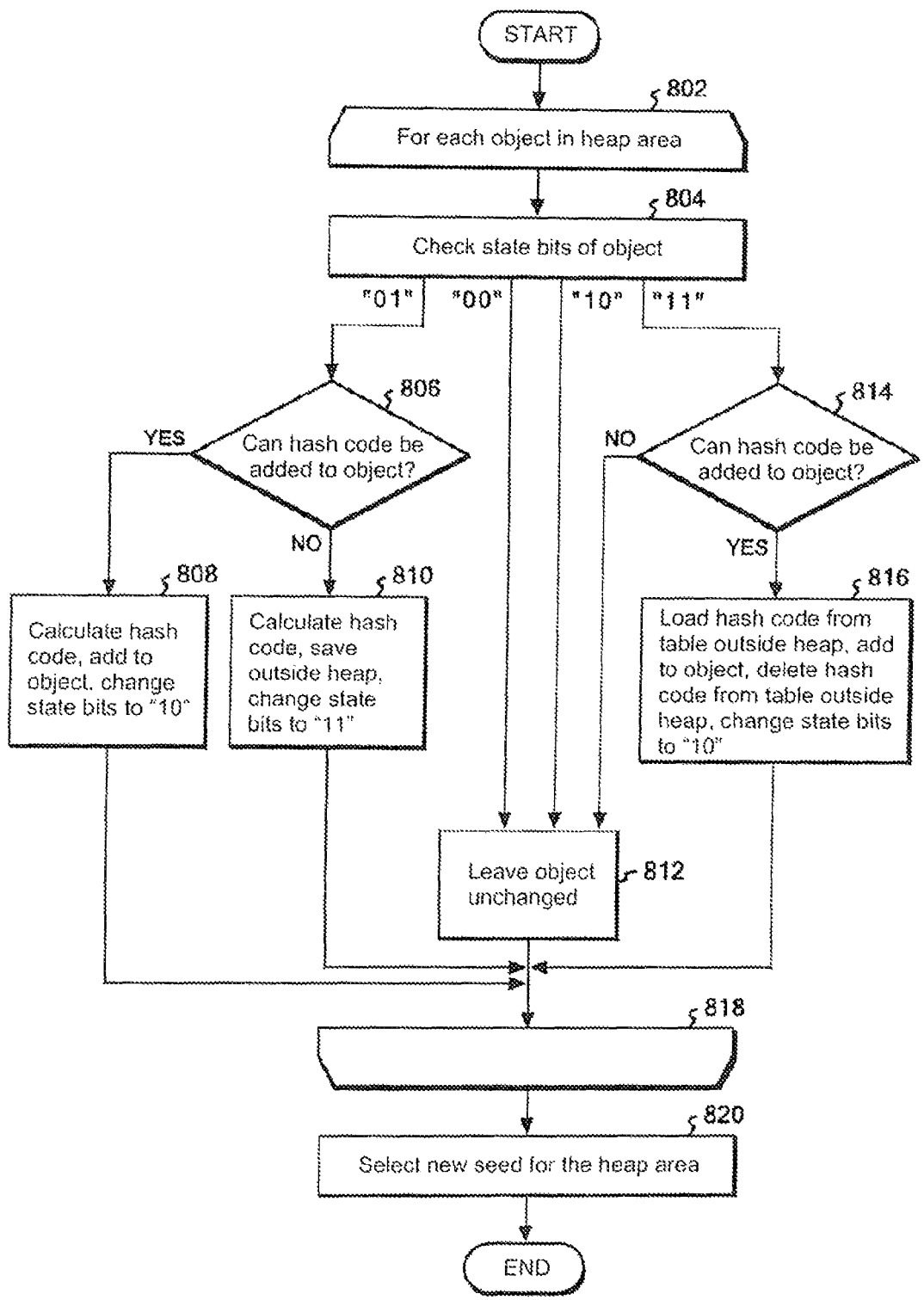
FIG. 8 is a detailed flowchart of the processing performed when an object is moved to another heap area in one embodiment of the present invention.

Processing performed by JVM 204, shown in FIG. 2, to move an object is demonstrated with reference to the flowchart in FIG. 8. Processing from Step 802 to Step 818 is performed on an object when an object is moved in a heap area.

In Step 804, JVM 204 checks the state bits (the two-bit code) of an object. In an embodiment of the present invention, if the state bits are in a "01" state, JVM 204 in Step 806 determines whether a hash code can be added to the object. This process is described in greater detail below with reference to the flowchart in FIG. 9.

An example of a situation in which a hash code can be added to the object is the addition of Hash Code 524 to Object 512 in FIG. 5. If a hash code can be added to the object, JVM 204 in Step 808 calculates the hash code by performing the processing shown in the flowchart of FIG. 7, then adds the calculated hash code to the object, and changes the state bits from "01" to "10". An example of a situation in which a hash code cannot be added to the object is the association of Hash Code 526 with Object 506 in FIG. 5. If a hash code cannot be added to the object, JVM 204 in Step 810 calculates the hash code by performing the processing shown in the flowchart of FIG. 7, then stores the calculated hash code outside the heap, and changes the state bits from "01" to "11".

Returning to Step 804, if the state bits are in a "00" or "10" state, the object either has not been hashed or the hash code has been added to the end of the object. In Step 812, nothing is done to the object with respect to a hash code. If the state bits are in a "11" state, JVM 204 in Step 814 determines whether a hash code can be added to the object. This process is described below with reference to the flowchart in FIG. 9.

If a hash code cannot be added to an object, the process simply proceeds to Step 812. If a hash code can be added to an object, JVM 204 in Step 816 acquires a hash code from the processing shown in the flowchart of FIG. 7, adds the hash code to the object, deletes the hash code associated with that object from the table outside the heap, and changes the state bits from "11" to "10".

After the process from Step 802 to Step 818 has been performed on each object in the heap area, JVM 204 in Step 820 selects a new seed for the heap using a pseudo-random number.

Figure 9:
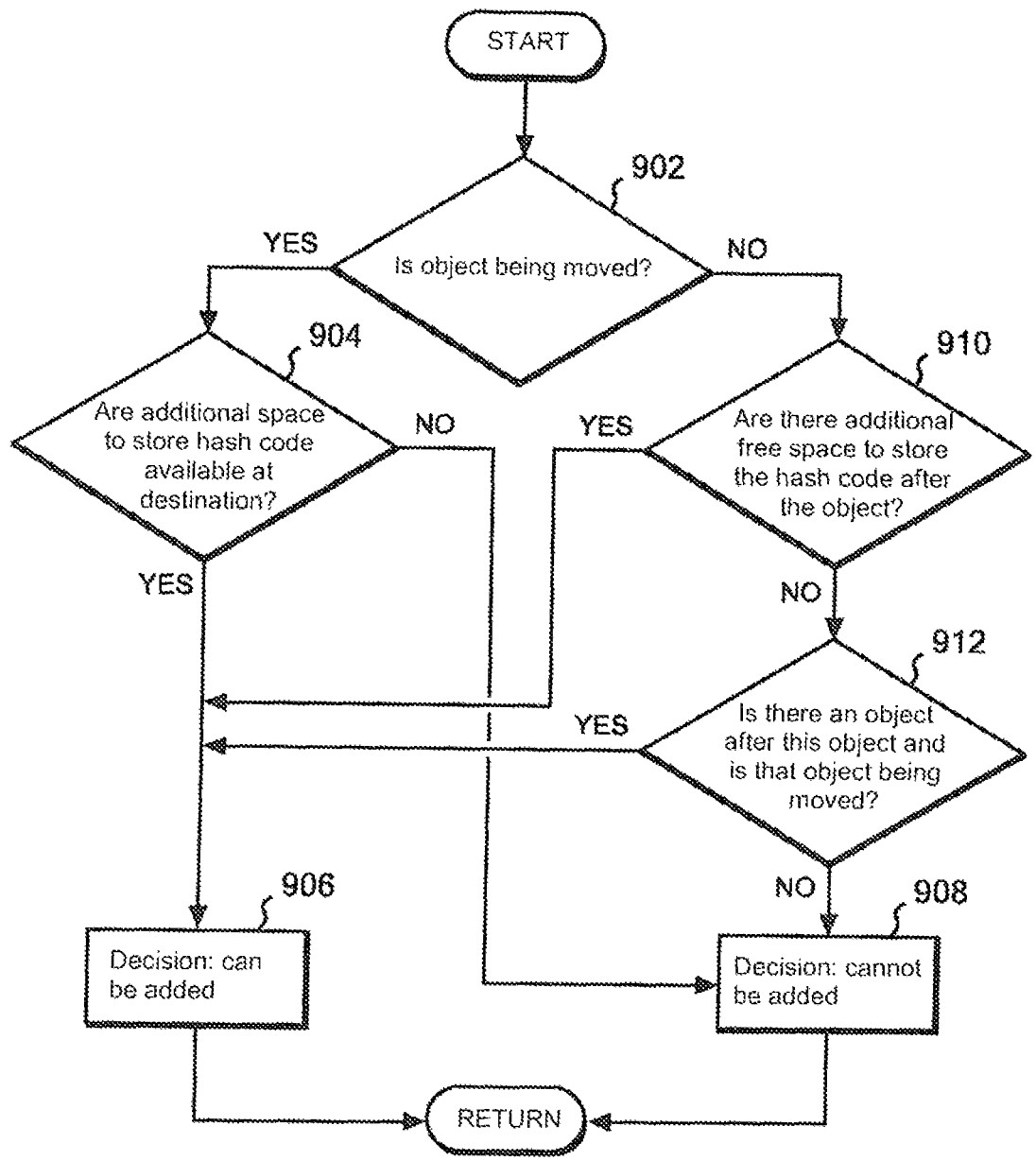
FIG. 9 is a flowchart exemplifying the processing performed to determine whether or not a hash code can be added to an object according to the present invention.

FIG. 9 is a flowchart of the processing used in the flowchart of FIG. 8 to determine whether a hash code can be added to an object. In Step 902, JVM 204 determines whether an object is being moved. If an object is being moved it is determined in Step 904 whether an additional area for storing hash code is available at the destination. If additional area for storing hash is available, Step 906 determines if a hash code can be added, this is set in a predetermined return code, and the process returns. If additional area for storing hash is not available, it is determined in Step 908 that a hash code cannot be added, this is set in a predetermined return code, and the process returns.

In FIG. 9 if an object is not being moved, JVM 204 in Step 910 determines whether there is enough empty space to store the hash code after the object. If there is enough empty space, the process proceeds to Step 906. If there is not enough additional free space after the object, JVM 204 in Step 912 determines whether there is another object and whether that object is being moved. If the additional object is being moved, the process proceeds to Step 906. If the additional object is not being moved, the process proceeds to Step 908 where it is determined that a hash code cannot be added, this step is set in a predetermined return code, and the process returns.

The present invention mitigates the shortcomings of previously known techniques. The embodiments of the present invention explained above are implemented in a Java® virtual machine. It should be understood that the present invention is not limited to specific hardware, a specific operating system or a specific application program. The present invention can be applied to any operating system or virtual machine with functions for assigning hash codes to objects allocated to a heap area. The present invention can also be applied to systems in a large-scale environment, for example those used in a cloud environment. Additionally, the present invention can be applied to a situation in which operations are performed in a stand-alone environment.

What is claimed is:

1. A computer-implemented method for generating a hash code to identify an object allocated to a heap area, wherein said heap area has a first heap area for holding a relatively new object and a second heap area for holding a relatively old object, said method comprising the steps of:
   generating a seed value for each said heap area;
   generating said hash code on the basis of the address of said object and said seed value of said heap area to which said object is allocated;
   determining whether or not said hash code can be added to said object in response to said object having been moved from said first heap area to said second heap area;
   adding said hash code to said object if it has been determined that said hash code can be added to said object; and
   associating said hash code with said object and placing said hash code outside of said heap if it has been determined that said hash code cannot be added to said object.

2. The method of claim 1, wherein the step for generating said hash code is performed on the basis of the address of said object, said seed value, and the value of the class ID of said object.

3. The method of claim 1, wherein said seed value is generated using a pseudo-random number.

4. An article of manufacture tangibly embodying computer readable instructions which, when implemented, cause a computer to perform the steps of a computer-implemented method for generating a hash code to identify an object allocated to a heap area, wherein said heap area has a first heap area for holding a relatively new object and a second heap area for holding a relatively old object, said method comprising the steps of:
   generating a seed value for each said heap area;
   generating said hash code on the basis of the address of said object and said seed value of said heap area to which said object is allocated;
   determining whether or not said hash code can be added to said object in response to said object having been moved from said first heap area to said second heap area;
   adding said hash code to said object if it has been determined that said hash code can be added to said object; and
   associating said hash code with said object and placing said hash code outside of said heap if it has been determined that said hash code cannot be added to said object.

5. The article of manufacture according to claim 4, wherein the step for generating said hash code is performed on the basis of the address of said object, said seed value, and the value of the class ID of said object.

6. The article of manufacture according to claim 4, wherein said seed value is generated using a pseudo-random number.

7. A computer-implemented system for generating a hash code to identify an object allocated to a heap area, said system including a processor and a memory which includes a hash code, an object, a seed value and a heap area, wherein said heap area has a first heap area for holding a relatively new object and a second heap area for holding a relatively old object, and wherein the processor is configured to perform the steps of a method comprising:
   generating said seed value for each said heap area;
   generating said hash code on the basis of the address of said object and said seed value of said heap area to which said object is allocated;
   determining whether or not said hash code can be added to said object in response to said object having been moved from the first heap area to the second heap area;
   adding said hash code to said object if it has been determined that said hash code can be added to said object; and
   associating said hash code with said object and placing said hash code outside of said heap if it has been determined that said hash code cannot be added to said object.

8. The system of claim 7, wherein the steps for generating said hash code is performed on the basis of the address of said object, said seed value, and the value of the class ID of said object.

9. The system of claim 7, wherein said seed value is generated using a pseudo-random number.

* * * * *